(12) United States Patent
Fornasari

(10) Patent No.: US 7,617,143 B2
(45) Date of Patent: Nov. 10, 2009

(54) GLOBAL RISK DEMAND INDEX

(75) Inventor: Francesca Fornasari, London (GB)

(73) Assignee: Morgan Stanley, New York, NY (US)

( * ) Notice: Subject to any disclaimer, the term of this patent is extended or adjusted under 35 U.S.C. 154(b) by 602 days.

(21) Appl. No.: 11/128,815

(22) Filed: May 13, 2005

(65) Prior Publication Data
US 2006/0259378 A1 Nov. 16, 2006

(51) Int. Cl.
*G06Q 40/00* (2006.01)
(52) U.S. Cl. ................................. 705/36 R
(58) Field of Classification Search ............... 705/36, 705/36 R
See application file for complete search history.

(56) References Cited

U.S. PATENT DOCUMENTS

| | | | | |
|---|---|---|---|---|
| 7,024,388 | B2 * | 4/2006 | Stefek et al. ................ | 705/38 |
| 2002/0007329 | A1 * | 1/2002 | Alcaly et al. ................ | 705/35 |
| 2003/0065600 | A1 * | 4/2003 | Terashima et al. .......... | 705/36 |
| 2003/0110016 | A1 * | 6/2003 | Stefek et al. ................ | 703/2 |
| 2003/0130917 | A1 * | 7/2003 | Crovetto .................... | 705/35 |
| 2004/0024695 | A1 * | 2/2004 | Melamed .................... | 705/38 |
| 2004/0172354 | A1 * | 9/2004 | Charnley, Jr. .............. | 705/36 |
| 2004/0172357 | A1 * | 9/2004 | Padgette .................... | 705/38 |
| 2005/0033676 | A1 * | 2/2005 | Charnley, Jr. .............. | 705/35 |
| 2005/0108134 | A1 * | 5/2005 | Harlow et al. .............. | 705/36 |
| 2005/0171884 | A1 * | 8/2005 | Arnott ....................... | 705/36 |
| 2006/0015430 | A1 * | 1/2006 | Megale et al. .............. | 705/35 |
| 2006/0020531 | A1 * | 1/2006 | Veeneman et al. .......... | 705/35 |
| 2006/0041490 | A1 * | 2/2006 | Roberts et al. ............. | 705/35 |
| 2008/0005008 | A1 * | 1/2008 | Alvarado et al. ........... | 705/36 R |
| 2008/0005009 | A1 * | 1/2008 | Alvarado et al. ........... | 705/36 R |
| 2008/0005010 | A1 * | 1/2008 | Alvarado et al. ........... | 705/36 R |

OTHER PUBLICATIONS

Miroslav Misina, "What Does the Risk-Appetite Index Measure?" Bank of Canada, Working Paper 2003-23, Aug. 2003, 27 pages.

Claude B. Erb, Campbell R. Harvey, Tadas E. Viskanta, "Political Risk, Economic Risk and Financial Risk," printed from http://www.duke.edu/~charvey/Country_risk/pol/pol.htm, internet site, accessed on Oct. 18, 2004, 16 pages.

Mardi Dungey, Renée Fry, Brenda González-Hermosillo, Vance Martin, "Characterizing Global Investors' Risk Appetite for Emerging Market Debt During Financial Crises," International Monetary Fund, IMF Working Paper WP/03/251, IMF Institute, Dec. 2003, 44 pages.

John Normand, "Managing Currency Risk in Global Portfolios," *thought*, Q4/2003, pp. 22-23.

(Continued)

*Primary Examiner*—Jagdish N Patel
*Assistant Examiner*—Kevin Poe
(74) *Attorney, Agent, or Firm*—K&L Gates LLP

(57) ABSTRACT

Methods for generating risk demand indices are provided. In various embodiments, the methods may include selecting a plurality of sub-index modules, wherein generation of each sub-index module involves comparing at least one financial index representative of at least one risky asset to at least one other financial index representative of at least one non-risky asset. The methods may further include combining the selected sub-index modules to calculate the risk demand indices.

26 Claims, 17 Drawing Sheets

OTHER PUBLICATIONS

Frank Packer, Philip D. Wooldridge, "Overview: Appetite for Risk Lifts Markets," *BIS Quarterly Review*, Mar. 2004, 12 pages.

Chapter II, "How Has Sep. 11 Influenced The Global Economy?" Dec. 12, 2001, pp. 14-33, accessed at http://www.imf.org/external/pubs/ft/weo/2001/03.

Chapter III, "Global and Regional Economic Prospects," Dec. 12, 2001, pp. 34-89. accessed at http://www.imf.org/external/pubs/ft/weo/2001/03.

Francesca Fornasari, "G10: A Guide to Trading Risk Demand in G10 Space," Excerpt from FX Pulse: Diversification Diversion, *FX Pulse*, Feb. 24, 2005, Morgan Stanley & Co. International Limited, London, 8 pages.

Francesca Fornasari, "G10: Introducing the MS Global Risk Demand Index," Excerpt from FX Pulse: Crude Intentions, *FX Pulse*, May 13, 2004, Morgan Stanley, London, 6 pages.

Francesca Fornasari, "GRDI Update," Mar. 7, 2005, Morgan Stanley & Co. International Limited, London, 7 pages.

Francesca Fornasari, "Global Risk Demand Index," Mar. 8, 2005, Morgan Stanley & Co. International Limited, London, 6 pages.

* cited by examiner

| | B | D | F | H | J | L | N | P | R | T | V | X | Z | AB |
|---|---|---|---|---|---|---|---|---|---|---|---|---|---|---|
| | World, J.P. Morgan, Emerging Markets Bond Index (EMBI Global), Total Return, Close, USD | World, J.P. Morgan, Global Broad Government Bond Index, Total Return, Close | World, LME, Metals index (LMEX), USD | World, CRB, Spot index, Close, USD | World, Reuters/CRB, Precious Metals Sub-index, Close, USD | World, Reuters/CRB, Energy Index (1977), Close, USD | World, Reuters/CRB, Total Return Index, Close, USD | World, MSCI, All Countries Free Price Return Index (LOC), Close | United States, Morgan Stanley, Cyclical Index, Close, USD | United States, CBOE, Volatility Index (VIX), Close, USD | United States, Corporate Benchmarks, AAA Rated, 5 Years, Yield, USD | United States, Corporate Benchmarks, BBB Rated, 5 Years, Yield, USD | United States, Government Benchmarks, 10 year, Yield, Close, USD | Euro Zone, Implied Option Volatilities, EUR/USD 3 month, Bid, Close, EUR |
| 3500 | Day 1 | 259.36 | 336.701 | 1166.7 | 251.44 | 300.97 | 246.7 | 207.92 | 237.629 | 461.09 | 20.51 | 2.625 | 4.723 | 3.4878 | 10.8 |
| 3501 | Day 2 | 258.34 | 337.322 | 1163.6 | 251.85 | 302.81 | 247.53 | 208.63 | 232.112 | 460.17 | 21.29 | 2.593 | 4.711 | 3.3574 | 10.6 |
| 3502 | Day 3 | 260.6 | 337.635 | 1178.4 | 251.64 | 303.92 | 250.33 | 208.81 | 232.112 | 459.8 | 21.21 | 2.565 | 4.713 | 3.3991 | 10.95 |
| 3503 | Day 4 | 262.59 | 337.975 | 1178.9 | 251.39 | 300.4 | 249.86 | 208.05 | 234.421 | 465.81 | 19.78 | 2.534 | 4.556 | 3.3162 | 10.7 |
| 3504 | Day 5 | 262.59 | 338.606 | 1168.1 | 251.39 | 300.4 | 251.03 | 208.21 | 234.421 | 465.74 | 19.17 | 2.544 | 4.502 | 3.3348 | 10.8 |
| 3505 | Day 6 | 262.59 | 338.718 | 1168.1 | 251.29 | 300.38 | 251.03 | 208.21 | 234.904 | 465.74 | 19.17 | 2.544 | 4.502 | 3.3348 | 10.8 |
| 3506 | Day 7 | 263.52 | 338.204 | 1184.4 | 250.61 | 301.12 | 251.51 | 206.36 | 237.5 | 475.96 | 19.99 | 2.589 | 4.558 | 3.4185 | 11.1 |
| 3507 | Day 8 | 262.57 | 337.22 | 1175.2 | 250.32 | 298.83 | 246.7 | 204.91 | 239.427 | 476.43 | 20.03 | 2.625 | 4.613 | 3.4263 | 10.55 |
| 3508 | Day 9 | 264.4 | 337.878 | 1180.7 | 250.29 | 294.18 | 249.77 | 203.9 | 239.34 | 472.75 | 20.43 | 2.539 | 4.583 | 3.3375 | 10.65 |
| 3509 | Day 10 | 264.11 | 337.971 | 1191.1 | 250.48 | 292.69 | 252.68 | 204.61 | 241.306 | 482.31 | 19.47 | 2.552 | 4.666 | 3.3728 | 10.7 |

| | EMBI | Government Bond | Spread Performance | Sub-Index Value |
|---|---|---|---|---|
| Day 1 | -0.08 | 0.42 | -0.50 | 205.77 |
| Day 2 | -0.39 | 0.18 | -0.58 | 204.59 |
| Day 3 | 0.87 | 0.09 | 0.78 | 206.19 |
| Day 4 | 0.76 | 0.10 | 0.66 | 207.55 |
| Day 5 | 0.00 | 0.19 | -0.19 | 207.16 |
| Day 6 | 0.00 | 0.03 | -0.03 | 207.10 |
| Day 7 | 0.35 | -0.15 | 0.51 | 208.14 |
| Day 8 | -0.36 | -0.29 | -0.07 | 208.00 |
| Day 9 | 0.70 | 0.20 | 0.50 | 209.04 |
| Day 10 | -0.11 | 0.03 | -0.14 | 208.76 |

| | CRB | Metal Index | Energy Index | Precious Metals Index | Spread Performance | Sub-Index Value |
|---|---|---|---|---|---|---|
| Day 1 | 97.408 | 76.730 | 108.012 | 116.764 | 0.003 | 41.087 |
| Day 2 | 97.567 | 76.526 | 108.376 | 117.477 | -0.007 | 40.783 |
| Day 3 | 97.486 | 77.500 | 109.602 | 117.908 | 0.005 | 40.997 |
| Day 4 | 97.389 | 77.533 | 109.396 | 116.543 | 0.007 | 41.290 |
| Day 5 | 97.389 | 76.822 | 109.908 | 116.543 | -0.012 | 40.815 |
| Day 6 | 97.350 | 76.822 | 109.908 | 116.535 | 0.000 | 40.816 |
| Day 7 | 97.087 | 77.894 | 110.118 | 116.822 | 0.012 | 41.297 |
| Day 8 | 96.974 | 77.289 | 108.012 | 115.933 | 0.006 | 41.528 |
| Day 9 | 96.963 | 77.651 | 109.356 | 114.129 | 0.006 | 41.787 |
| Day 10 | 97.036 | 78.335 | 110.630 | 113.551 | 0.006 | 42.017 |

FIG. 6

| | VIX | Bond | FX | FX - Level | FX-slope | FX - Level 1 wk | FX - Level 3mo | "MOVE" Index |
|---|---|---|---|---|---|---|---|---|
| Day 1 | 97.51 | 102.17 | 108.56 | 9.96 | -0.26 | 10.06 | 9.80 | 97.88 |
| Day 2 | 93.94 | 95.79 | 110.15 | 9.62 | -0.06 | 9.64 | 9.58 | 104.39 |
| Day 3 | 94.30 | 92.13 | 108.12 | 9.70 | 0.04 | 9.68 | 9.72 | 108.54 |
| Day 4 | 101.11 | 97.30 | 111.84 | 9.43 | -0.02 | 9.44 | 9.42 | 102.78 |
| Day 5 | 104.33 | 100.47 | 111.40 | 9.42 | 0.03 | 9.41 | 9.44 | 99.53 |
| Day 6 | 104.33 | 100.47 | 109.56 | 9.19 | 0.42 | 9.02 | 9.44 | 99.53 |
| Day 7 | 100.05 | 100.39 | 109.65 | 9.80 | -0.20 | 9.88 | 9.68 | 99.61 |
| Day 8 | 99.85 | 99.65 | 114.37 | 9.34 | -0.14 | 9.40 | 9.26 | 100.35 |
| Day 9 | 97.90 | 100.57 | 113.41 | 9.35 | -0.07 | 9.38 | 9.31 | 99.43 |
| Day 10 | 102.72 | 100.19 | 116.11 | 9.68 | -0.61 | 9.92 | 9.31 | 99.81 |

| | AAA - 5year | BBB - 5year | Government Bond Index | BBB vs. AAA Outperformance | AAA vs. Government Outperformance | Sub-Index Value | Sub-Index Value |
|---|---|---|---|---|---|---|---|
| Day 1 | 0.0016 | 0.0013 | 0.0042 | -0.0003 | -0.0026 | 94.1966 | 101.0431 |
| Day 2 | 0.0018 | 0.0016 | 0.0018 | -0.0002 | 0.0000 | 94.1945 | 101.0179 |
| Day 3 | -0.0017 | -0.0018 | 0.0009 | -0.0001 | -0.0026 | 93.9476 | 101.0049 |
| Day 4 | 0.0013 | 0.0014 | 0.0010 | 0.0001 | 0.0003 | 93.9790 | 101.0141 |
| Day 5 | 0.0000 | 0.0003 | 0.0019 | 0.0003 | -0.0019 | 93.8001 | 101.0451 |
| Day 6 | 0.0004 | 0.0005 | 0.0003 | 0.0001 | 0.0001 | 93.8083 | 101.0553 |
| Day 7 | 0.0007 | 0.0012 | -0.0015 | 0.0005 | 0.0022 | 94.0134 | 101.1076 |
| Day 8 | -0.0001 | 0.0004 | -0.0029 | 0.0005 | 0.0028 | 94.2779 | 101.1582 |
| Day 9 | 0.0019 | 0.0018 | 0.0020 | 0.0000 | -0.0001 | 94.2713 | 101.1548 |
| Day 10 | -0.0005 | 0.0000 | 0.0003 | 0.0005 | -0.0008 | 94.1993 | 101.2062 |

|  | | USD Swap Rate | 10 year yield | Spread Index |
|---|---|---|---|---|
| 3500 | Day 1 | 3.745 | 3.4878 | 174.28 |
| 3501 | Day 2 | 3.745 | 3.3574 | 161.24 |
| 3502 | Day 3 | 3.635 | 3.3991 | 176.41 |
| 3503 | Day 4 | 3.678 | 3.3162 | 163.82 |
| 3504 | Day 5 | 3.638 | 3.3348 | 169.68 |
| 3505 | Day 6 | 3.638 | 3.3348 | 169.68 |
| 3506 | Day 7 | 3.705 | 3.4185 | 171.35 |
| 3507 | Day 8 | 3.705 | 3.4263 | 172.13 |
| 3508 | Day 9 | 3.715 | 3.3375 | 162.25 |
| 3509 | Day 10 | 3.737 | 3.3728 | 163.58 |

| 406 | | Overall Index | Z Score of Sub Index | Dispersion Index | Overall Index w/o FX | Z Score w/o FX |
|---|---|---|---|---|---|---|
| 3500 | Day 1 | 100.87 | 0.90 | 47.32 | 100.05 | 1.02 |
| 3501 | Day 2 | 99.07 | 0.43 | 45.51 | 97.91 | 0.50 |
| 3502 | Day 3 | 99.51 | 0.52 | 48.16 | 98.60 | 0.64 |
| 3503 | Day 4 | 100.59 | 0.76 | 46.21 | 99.42 | 0.80 |
| 3504 | Day 5 | 101.40 | 0.93 | 46.87 | 100.34 | 0.99 |
| 3505 | Day 6 | 101.23 | 0.86 | 46.85 | 100.34 | 0.95 |
| 3506 | Day 7 | 101.22 | 0.83 | 47.25 | 100.33 | 0.92 |
| 3507 | Day 8 | 101.80 | 0.95 | 47.25 | 100.49 | 0.93 |
| 3508 | Day 9 | 101.09 | 0.74 | 46.14 | 99.81 | 0.74 |
| 3509 | Day 10 | 101.99 | 0.94 | 46.08 | 100.53 | 0.88 |

| 406 | | EMBI vs. G10 bond performance | Metals vs. Precious Metal Performance | G10 bond vs Equity Performance | Equity Cyclical vs. Non Cyclical Performance | Vol VIX | Vol Bond | Vol FX | BBB vs. AAA Performance | AAA vs. Govt. Performance | Swap Index | Overall Index | St. GRDI |
|---|---|---|---|---|---|---|---|---|---|---|---|---|---|
| 3500 | Day 1 | 205.77 | 42.03 | 99.91 | 71.97 | 97.51 | 102.17 | 108.56 | 101.04 | 94.19 | 174.28 | 101.51 | 0.90 |
| 3501 | Day 2 | 204.59 | 41.72 | 99.91 | 71.87 | 93.94 | 95.79 | 110.15 | 101.02 | 94.19 | 161.24 | 99.51 | 0.43 |
| 3502 | Day 3 | 206.19 | 41.93 | 99.90 | 71.74 | 94.30 | 92.13 | 108.12 | 101.00 | 93.94 | 176.41 | 100.01 | 0.52 |
| 3503 | Day 4 | 207.55 | 42.23 | 99.91 | 72.43 | 101.11 | 97.30 | 111.84 | 101.01 | 93.97 | 163.82 | 101.22 | 0.76 |
| 3504 | Day 5 | 207.16 | 41.85 | 99.90 | 72.43 | 104.33 | 100.47 | 111.40 | 101.04 | 93.79 | 169.68 | 102.15 | 0.93 |
| 3505 | Day 6 | 207.10 | 41.75 | 99.88 | 72.44 | 104.33 | 100.47 | 109.56 | 101.05 | 93.80 | 169.68 | 101.93 | 0.86 |
| 3506 | Day 7 | 208.14 | 42.24 | 99.89 | 73.33 | 100.05 | 100.39 | 109.65 | 101.11 | 94.01 | 171.35 | 101.91 | 0.83 |
| 3507 | Day 8 | 208.00 | 42.48 | 99.90 | 74.12 | 99.85 | 99.65 | 114.37 | 101.16 | 94.27 | 172.13 | 102.53 | 0.95 |
| 3508 | Day 9 | 209.04 | 42.74 | 99.89 | 73.96 | 97.90 | 100.57 | 113.41 | 101.15 | 94.27 | 162.25 | 101.75 | 0.74 |
| 3509 | Day 10 | 208.76 | 42.98 | 99.90 | 74.58 | 102.72 | 100.19 | 116.11 | 101.21 | 94.19 | 163.58 | 102.75 | 0.94 |

Trading rule statistics

| | Unconditional forward bias basket | Conditional risk basket | Combo Basket |
|---|---|---|---|
| Annualized return | 4.87 | 6.02 | 5.44 |
| Max gain: quarterly | 8.54 | 11.72 | 7.91 |
| Max loss: quarterly | -7.11 | -8.43 | -5.32 |
| Sharpe Ratio | 1.07 | 1.12 | 1.50 |

Risk Optimized Basket Weights (%)

| AUD | CAD | NZD | EUR | USD | JPY | GBP | NOK | SEK | CHF |
|---|---|---|---|---|---|---|---|---|---|
| 17 | 20 | 4 | -14 | 12 | -19 | 10 | 6 | -16 | -20 |

FIG. 16A

Weights suggested by current GRDI reading

| | Unconditional forward bias basket | Conditional risk basket | Combination Basket |
|---|---|---|---|
| USD | -0.25 | 0.25 | 0.00 |
| EUR | 0.00 | 0.25 | 0.25 |
| JPY | -0.25 | 0.25 | 0.00 |
| GBP | 0.25 | -0.17 | 0.08 |
| AUD | 0.25 | -0.17 | 0.08 |
| CAD | 0.00 | -0.17 | -0.17 |
| NZD | 0.25 | -0.17 | 0.08 |
| SEK | 0.25 | -0.17 | 0.08 |
| NOK | -0.25 | -0.17 | -0.42 |
| CHF | -0.25 | 0.25 | 0.00 |
| | | Standardized MSGRDI | -2.22 |

FIG 16B

GLOBAL RISK DEMAND INDEX

BACKGROUND

For investors, managing the risks associated with investment decisions is a challenging task in a perpetually changing global marketplace. An experienced investor understands the impact of risk on the performance of an investment portfolio and appreciates that that risk must be duly considered when modifying the composition of the portfolio.

Historically, financial services firms have collected a wide variety of market performance data and have developed complex indices, extensive financial models, and other intricate analysis tools to assist investors in making investment decisions. However, these analysis tools are often too complicated and difficult for investors to understand and implement effectively in connection with making investment decisions. In addition, many existing financial models and financial indices do not adequately factor demand for risky assets into their calculations. Lack of sufficient consideration of risk or risk demand in investment decisions can limit the potential for returns on investments in a portfolio.

In view of these problems, more effective and efficient financial tools are needed for analyzing market data and for developing investment strategies for investors.

SUMMARY

The present invention provides embodiments of a method, which may be implemented at least in part with a computer system, for generating a risk demand index. The method may include selecting a plurality of sub-index modules, the selected plurality including at least two of the following sub-index modules, wherein generation of each sub-index module involves comparing at least one financial index representative of at least one risky asset to at least one other financial index representative of at least one non-risky asset: a bond sub-index module generated by comparing an emerging markets index against a government bond index; a commodity sub-index module generated by comparing a base metal index against a precious metals index; a bond/equity sub-index module generated by comparing a government bond index against an equity index; an equity sub-index module generated by comparing a cyclical stock index against a non-cyclical stock index; an equity market volatility sub-index module; a bond market volatility sub-index module; a currency exchange (FX) sub-index module; a first credit sub-index module generated by comparing a high yield debt instrument index against a high grade debt instrument index; a second credit sub-index module generated by comparing a government bond index against a high grade debt instrument index; or, a swap spread sub-index module. The method may further include combining the selected sub-index modules to calculate the risk demand index.

The present invention also provides embodiments of a method, which may be implemented at least in part with a computer system, for generating a risk demand index. The method may include selecting at least the following sub-index modules, wherein generation of each sub-index module involves comparing at least one financial index representative of at least one risky asset to at least one other financial index representative of at least one non-risky asset: a commodity-related sub-index module; a bond-related sub-index module; a credit market sub-index module; and, an equity-related sub-index module. The method may further include combining the sub-index modules to calculate the risk demand index.

The present invention also provides computer systems and computer-readable media including instructions for executing various aspects of the methods for generating risk demand indices provided in accordance with the present invention.

BRIEF DESCRIPTION OF THE FIGURES

The utility of the embodiments of the invention will be readily appreciated and understood from consideration of the following description of the embodiments of the invention when viewed in connection with the accompanying drawings.

FIG. 4 is a table including sample financial index data that may be communicated or processed in accordance with embodiments of the invention;

FIGS. 5 through 9 include various tables illustrating calculation of sample sub-index module values in accordance with embodiments of the invention;

FIGS. 12 and 13 include tables illustrating calculations of sample risk demand index data in accordance with embodiments of the invention;

FIG. 14 includes a table summarizing trading rule statistics associated with practice of certain embodiments of the invention;

FIGS. 16A and 16B include tabulations of a weight analysis conducted in association with practice of certain embodiments of the invention; and, FIG. 17 schematically illustrates an architecture for communicating or processing index data in accordance with embodiments of the invention.

DESCRIPTION

As applied herein, the term "financial data processor" includes any entity capable of calculating, analyzing and/or employing index data in accordance with the present invention. Examples of "financial data processors" include, without limitation, financial advisory firms, investment banks, banks, insurance companies, hedge funds, and mutual funds.

The term "financial data provider" includes any entity that generates, calculates or provides a financial index or financial indices that can be applied in accordance with embodiments of the present invention. Examples of "financial data providers" include, without limitation, entities operating under the trade designations "Bloomberg," "EcoWin," "Datastream," and other like entities.

The term "investor" includes any firm, corporation, partnership, institution, individual, group of individuals, or other entity that holds, manages or pursues one or more investments or one or more portfolios of investments.

As applied herein, those skilled in the art will appreciate the characteristics of a "risky" asset or investment in comparison to the characteristics of a "non-risky" or "safe" asset or investment. For example, a cyclical stock will be readily recognizable by the skilled artisan as "risky" in comparison to a non-cyclical stock which has "non-risky" or "safe" characteristics.

Figure 1:
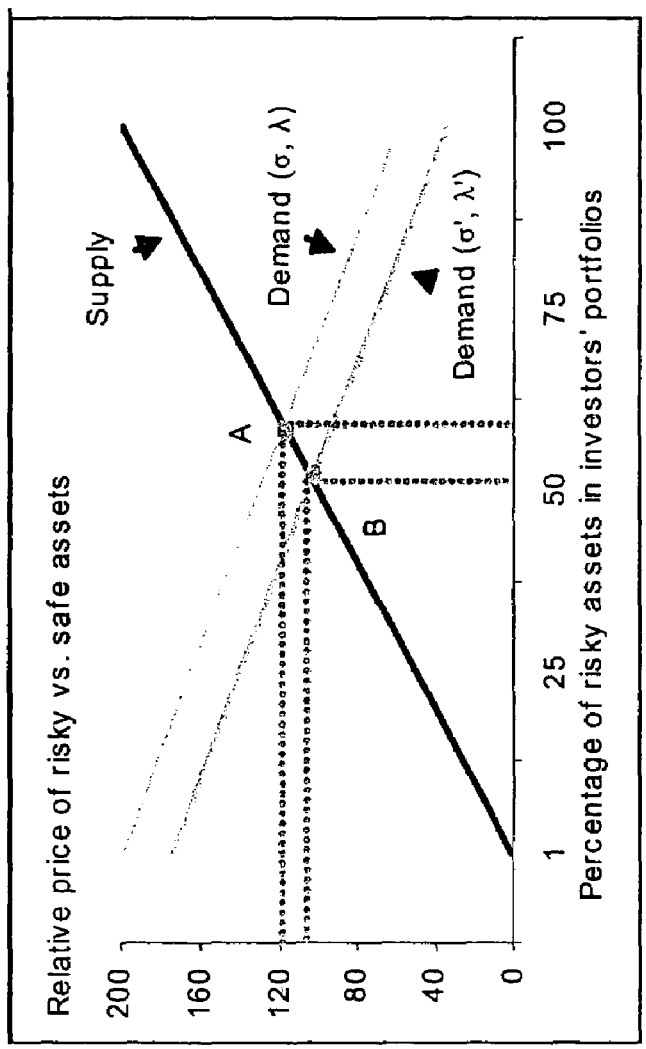
FIG. 1 includes a graph that schematically displays a framework in which embodiments of the present invention may be practiced.

Embodiments of the present invention are provided within a framework that assesses comparative market performance of risky assets and non-risky assets. For investors, it is important to measure and understand "risk aversion" and "risk": "risk aversion" represents willingness to take risk, whereas "risk" represents the distribution of possible investment outcomes. Both risk aversion and risk may affect demand for risky assets. As shown in FIG. 1, assuming the supply of risky versus safe assets is unchanged, changes in risk aversion ($\lambda$) and risk ($\sigma$) both influence the demand for risky versus safe assets. More specifically, higher risk aversion ($\lambda'$) and/or higher risk ($\sigma'$) may shift risk demand to the left and lead to a lower price of risky versus safe assets, as well as a lower percentage of risky assets. To effectively gauge changes in risk demand by comparing the price performance of risky assets in comparison to safe assets, a broad variety of asset prices may be monitored in various markets. The inventor has found that capturing shifts in the risk demand driven by changes in risk aversion should involve monitoring different asset classes; if all risky assets outperform non-risky assets, then a shift in risk aversion can be predicted. In addition, it can be difficult to predict when, where and under what circumstances financial crises will develop in global markets. Monitoring different markets maximizes the possibility of capturing early warning signs of financial crises that may result in risk demand changes.

Figure 2:
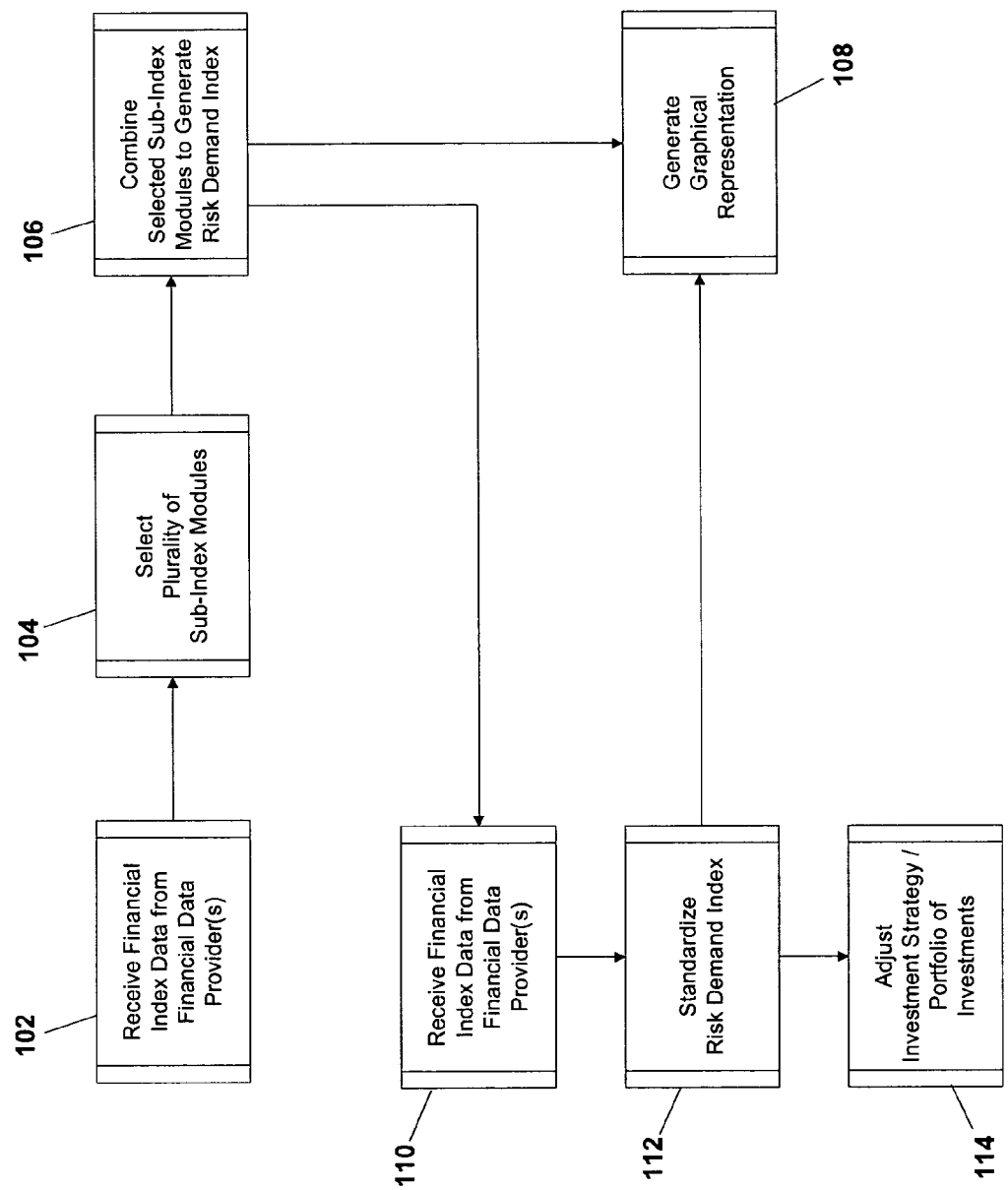
FIG. 2 includes a process flow diagram illustrating embodiments of a method for generating risk demand indices.
Figure 3:
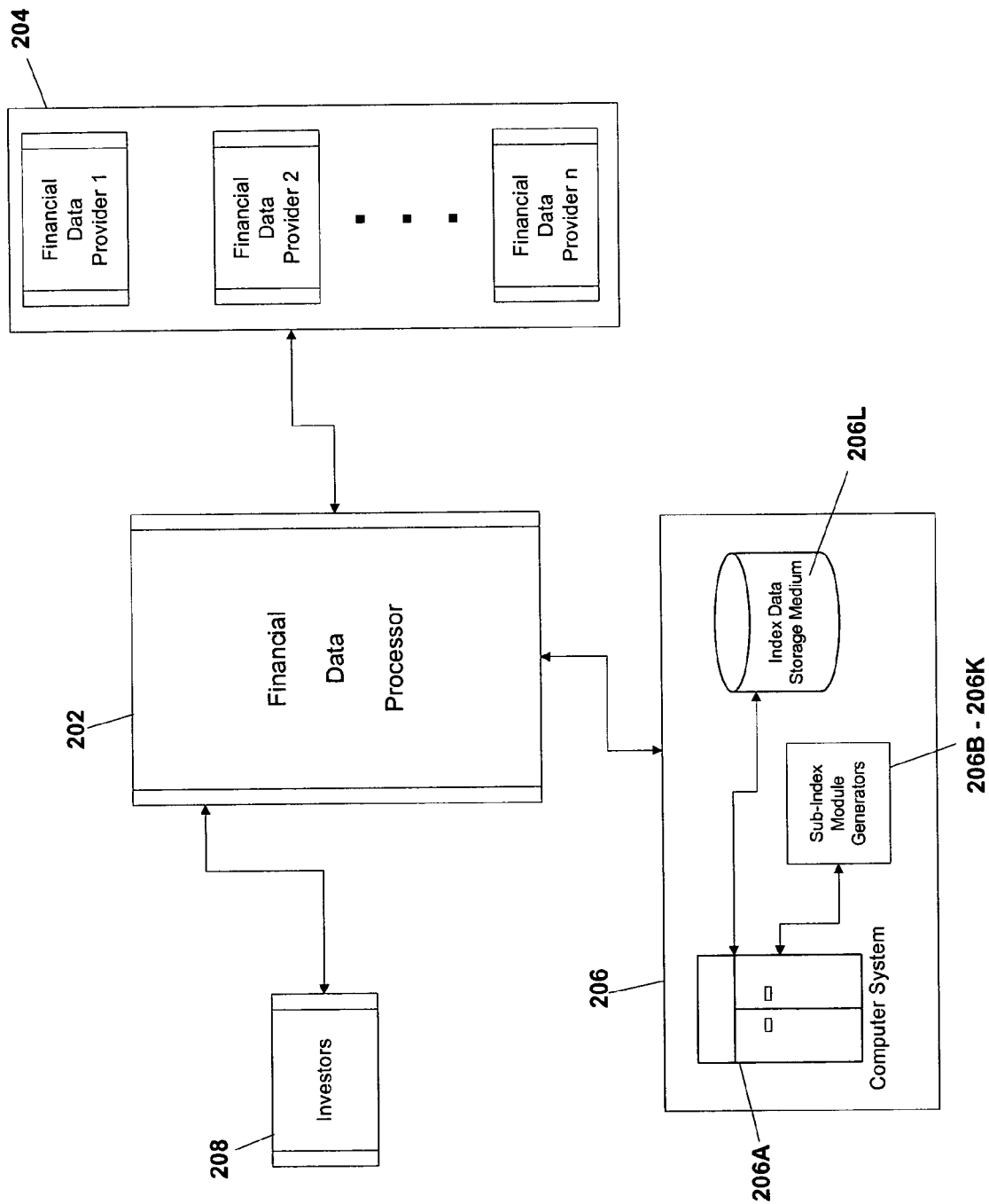
FIG. 3 schematically illustrates an architecture for communicating or processing index data in accordance with embodiments of the invention.

Referring now to FIGS. 2 and 3, generation of a risk demand index in accordance with embodiments of the present invention is illustrated. At step 102, a financial data processor 202 may be configured for receiving "raw" financial index data from a plurality of financial data providers 204, as shown. The financial data processor 202 may be operatively associated with a financial data processing system 206 including a computer system 206A, a plurality of sub-index module generators 206B-206K, and an index data storage medium 206L. The financial data processor 202 may generate and provide risk demand index data to one or more investors 208 that may employ the risk demand index data in association with executing an investment strategy or managing a portfolio of investments, for example. In certain embodiments, the financial data processing system 206 may be configured to execute spreadsheet software programs that facilitate calculation and management of risk demand indices generated in accordance with the invention.

At step 104, a plurality of sub-index modules may be selected by a financial data processor 202 from the sub-index module generators 206B-206K, as the basis for calculation of the risk demand index. Generation or calculation of sub-index modules may involve comparing at least one financial index representative of at least one risky asset to at least one other financial index representative of at least one non-risky asset. Examples of sub-index modules that may be generated in accordance with embodiments of the present invention include the following: a bond sub-index module may be generated by configuring the sub-index module generator 206B for comparing an emerging markets index against a government bond index; a commodity sub-index module may be generated by configuring the sub-index module generator 206C for comparing a base metal index against a precious metals index; a bond/equity sub-index module may be generated by configuring the sub-index module generator 206D for comparing a government bond index against an equity index; an equity sub-index module may be generated by configuring the sub-index module generator 206E for comparing a cyclical stock index against a non-cyclical stock index; an equity market volatility sub-index module may be generated by the sub-index module generator 206F; a bond market volatility sub-index module may be generated by the sub-index module generator 206G; a currency exchange (FX) sub-index module may be generated by the sub-index module generator 206H; a first credit sub-index module may be generated by configuring the sub-index module generator 206I for comparing a high yield debt instrument index against a high grade debt instrument index; a second credit sub-index module may be generated by configuring the sub-index module generator 206J for comparing a government bond index against a high grade debt instrument index; and/or, a swap spread sub-index module may be generated by the sub-index module generator 206K. At step 104, in certain embodiments of the invention, more choices, fewer choices or a subset of the sub-index modules described herein may be made available for selection.

The comparing function performed by the sub-index module generators 206B-206K in generating values for the various sub-index modules may include a variety of calculation techniques. For example, a sub-index module may be generated for a given market trading period (e.g., a trading day) by calculating a percentage increase/decrease for a first financial index representative of a risky asset; calculating a percentage increase/decrease for a second financial index representative of a non-risky asset; calculating the net difference or spread between the first percentage increase/decrease and the second percentage increase/decrease; and, applying the calculated spread to the sub-index module value of a previous trading period (e.g., a prior trading day) to calculate a sub-index module value for the current trading period. It can be appreciated that other calculation methods such as scaling, weighting, and/or other techniques known to those skilled in the art may be factored into executing the comparing function for various sub-index modules described herein. For the purpose of illustrating embodiments of the present invention, examples of certain sub-index module calculations are provided below in more detail.

The following description includes examples of how values may be calculated for the various sub-index modules described herein. It will be appreciated that these examples are provided for the primary purpose of illustrating certain embodiments of the present invention.

With reference to FIG. 4, a tabulation 402 includes "raw" financial index data 404 that may be communicated or transmitted by one or more financial data providers 204 (e.g., "EcoWin") for processing by the financial data processor 202. In this example, the index data 404 in the table 402 corresponds to market activity during a ten-day period 406 with respect to multiple, conventionally available financial indices 408, as shown.

Referring now to FIG. 5, a table 502 illustrates how a value 504 for the bond sub-index module may be generated by configuring the sub-index module generator 206B for comparing percentage change for an emerging markets bond index (EMBI) 506 against percentage change for a government bond index 508. The value 504 may be generated for a given market trading day by calculating a percentage increase/decrease for the EMBI 506; calculating a percentage increase/decrease for the government bond index 508; calculating the net difference 510 or spread between the EMBI 506 percentage increase/decrease and the government bond 508 percentage increase/decrease; and, applying the calculated spread 510 to the sub-index module value of a previous trading period (e.g., a prior trading day) as a percentage change to calculate the sub-index module value 504 for the current trading period.

With reference to FIG. 6, a table 602 illustrates how a value 604 for the commodity sub-index module may be generated by configuring the sub-index module generator 206C for comparing a base metal index 606 against a precious metals index 608. In this example, one or more energy indices 610, 612 may also be factored into calculation of the value 604 for the commodity sub-index module. The value 604 may be generated for a given market trading day by calculating respective percentage increases/decreases for the indices 606, 608, 610, 612; calculating a spread performance value 614 representing a difference in percentage increases/decreases between two of the indices 606, 608, 610, 612, or between one of the indices 606, 608, 610, 612 and an average percentage increase/decrease value for two or more of the indices 606, 608, 610, 612; and, applying the calculated spread 614 to the sub-index module value of a previous trading period (e.g., a prior trading day) as a percentage change for calculating the sub-index module value 604 for the current trading period.

With reference to FIG. 7, a table 702 illustrates how several volatility related sub-index module values 704, 706, 708 may be calculated for the risk demand index. In addition to the percentage change calculation methods described above, the volatility VIX value 704 may be calculated by inverting a "raw" index value (e.g., 1/[index value]), and then multiplying the result by a scaling factor (e.g., 2000) to arrive at the volatility VIX value 704. Also, FX volatility 708 may include both the level of the volatility 708A as well as the steepness 708B of the FX curve. In certain applications of embodiments of the present invention, it may be desirable not to consider the effect of volatility in association with generating the risk demand index.

With reference to FIG. 8, a table 802 illustrates how credit related sub-index module values 804, 806 may be calculated for the risk demand index. The values 804, 806 may be calculated by employing the percentage change and spread calculation methods described above.

With reference to FIG. 9, a table 902 illustrates how a value 904 may be calculated for a swap spread sub-index module by operation of the sub-index module generator 206K. As shown, the sub-index module value 904 may be calculated by applying a scaling factor to the mathematical difference between two indices 906, 908. In this example, the difference in the index values 906, 908 is first multiplied by a scaling factor (e.g., 200), and then another scaling factor (e.g., 100) is added to the product to arrive at the final sub-index module value 904.

The modularity and flexibility of risk demand index generation provided in accordance with the present invention will be readily apparent to those skilled in the art. Selection of the sub-index modules at step 104 may be based on a number of factors. For example, an analyst desiring to predict performance for equity related assets in the market might decide not to include any equity related sub-index modules for generation of the risk demand index. In addition, in another example, volatility related sub-index modules may or may not be included in generation of the risk demand index. In certain embodiments of the invention, the investor 208 or financial data processor 202 may select at least the following modules: a commodity-related sub-index module, a bond-related sub-index module, a credit market sub-index module, and an equity-related sub-index module, in connection with generating the risk demand index. In various embodiments, at least about four to six sub-index modules may be selected to comprise the plurality of sub-index modules used to generate the risk demand index.

At step 106, the processing system 206 of the financial data processor 202 may be configured for combining the sub-index modules selected at step 104 to calculate or generate the risk demand index. For example, combining the selected sub-index modules may involve calculating a geometric average of the individually generated values for the selected sub-index modules. In general, the risk demand index may be configured such that a higher reading for the risk demand index indicates a higher appetite for risk; and conversely, a lower reading for the risk demand index indicates a lower appetite for risk.

Figure 10:
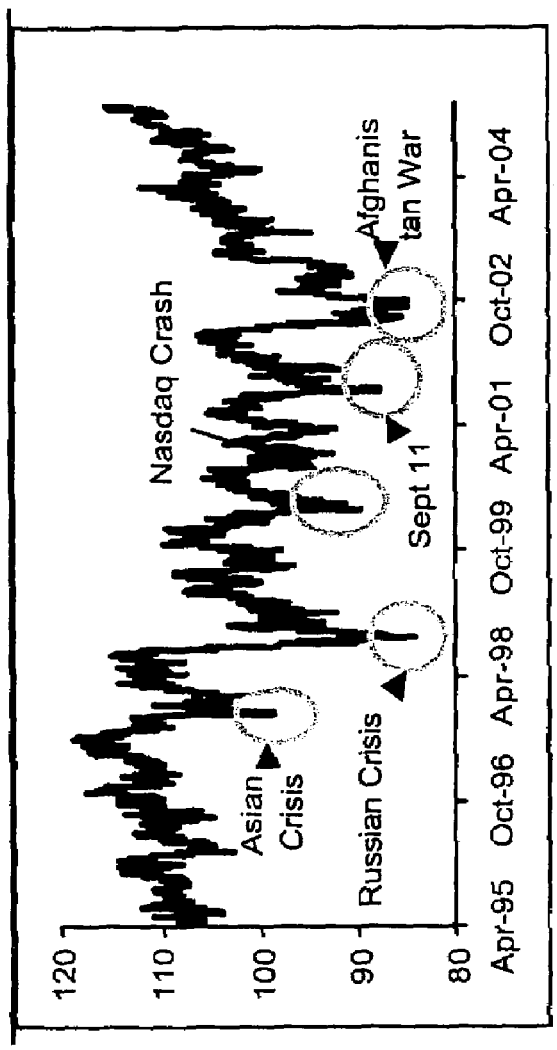
FIG. 10 includes a graph that charts risk demand index values generated over a period of time in accordance with embodiments of the invention.

At step 108, a graphical representation of the risk demand index may be generated and displayed for multiple market trading periods. An example of a graph of the risk demand index over a period of time is shown in FIG. 10. It can be seen that charting the risk demand index in this manner may reveal broad market trends including significant drops or rises in risk demand in response to events or crises that affect the market for various assets. In addition, a dispersion index may be generated at step 110 by calculating the standard deviation of sub-index module values. The dispersion index may be employed to indicate the relative strength of the risk demand index with respect to its use as a trading signal for making investment decisions.

Figure 11:
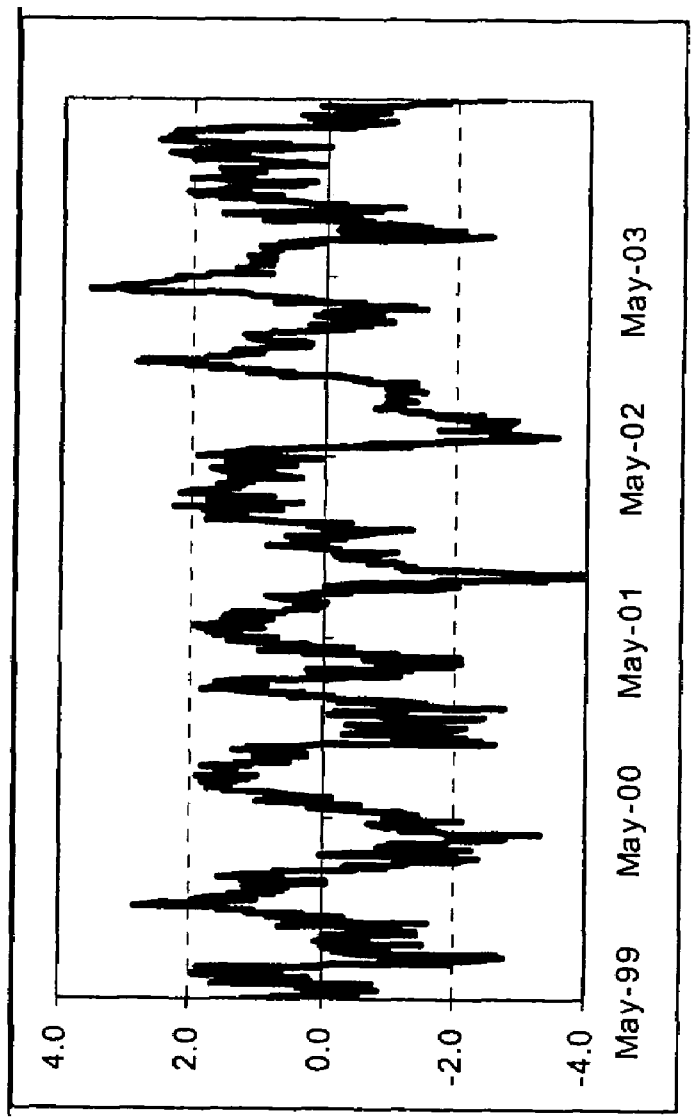
FIG. 11 includes a graph that charts standardized risk demand index values generated over a period of time in accordance with embodiments of the invention.

At step 112, in certain embodiments of the invention, the risk demand index may be standardized or transformed by conventional techniques to conform to a mean value, such as a mean of zero. This standardization may be accomplished, at least in part, by calculating a standard deviation for a selected population of values for each sub-index module. The standardized risk demand index may be charted over a period of time (in accordance with step 108, for example) such that a positive reading for the standardized index indicates higher appetite for risky assets, and a negative reading for the standardized index indicates lower appetite for risky assets. An example of the standardized risk demand index charted over time is illustrated in FIG. 11.

For purposes of illustration, the index data and calculation methods described in the examples above (i.e., FIGS. 4 through 9) may be applied to the general principles of steps 106, 110, and 112. With reference to FIG. 12, a summary tabulation 1202 provides sample aspects of the operation of steps 106, 110, and 112. As shown, for the ten-day marketing trading period 406, an overall risk demand index 1204 may be generated by calculating a geometric average of values for the plurality of sub-index modules selected at step 104. A dispersion index value 1206 may be calculated by taking the standard deviation of the calculated sub-index modules. The dispersion index 1206 may provide an indication of the strength or weakness of the trading signal represented by the risk demand index. In certain embodiments, the risk demand index may be scaled or adjusted to account for the calculated dispersion index value 1206. In addition, with a view to standardizing or transforming the risk demand index around a mean value (e.g., a mean of zero), a Z-score 1208 may be calculated for a population of the sub-index module values. Furthermore, in this example, a value 1210 for the overall index and/or a value 1212 for the Z-score may be calculated without factoring FX volatility.

With reference to FIG. 13, a table 1302 summarizing the various sub-index module values 1304 for the marketing trading period 406 is provided. In accordance with the discussion above, an overall index 1306 and a standardized index 1308 may be calculated for the risk demand index.

At step 114, in certain embodiments of the invention, the risk demand index may be employed to adjust an investment strategy or a portfolio of investments. For example, a trading rule may be devised for a risk optimized portfolio including a basket of investments, such that if the standardized risk demand index rises above a certain level, then one or more short positions in a basket of investments are converted to long positions. Conversely, a trading rule may be devised such that if the standardized risk demand index falls below a certain level for the risk optimized portfolio, then one or more long positions in the basket are converted to short positions.

For example, embodiments of the risk demand index of the present invention may be practically applied to investment strategies involving currency markets (FX). It has been observed that cash tends to flow from lower yielding currencies to higher yielding currencies: this is known as a "forward bias" in FX markets. It has also been observed that, in times of higher risk aversion and/or higher risk, investors tend to favor "safe haven" currencies. In general, a currency may be considered a "safe haven" if it either has deep liquid markets, for example, or is perceived by investors as relatively immune from geopolitical risks. The USD, JPY, EUR, and CHF currencies have historically been considered "safe haven" currencies.

In one example that demonstrates the usefulness of the risk demand index of the present invention, three baskets of currency investments may be constructed. A first forward bias basket may be constructed for which three-month rates are ranked every day across all G10 currencies—USD, EUR, JPY, GBP, AUD, CAD, NZD, SEK, NOK, CHF. The forward bias basket invests in the four highest yielding G10 currencies by borrowing in the four lowest yielding G10 currencies. A second risk basket may be constructed by investing in risky currencies with funding derived from "safe haven" currencies. A third combination basket may be constructed by investing 50% in the forward bias basket and 50% in the risk basket.

In this example, two separate daily trading rules are applied to the forward bias basket and the risk basket: in a first unconditional strategy, long exposure to both baskets is kept regardless of the reading of the standardized risk demand index; in the second strategy, long exposure to each basket is kept as long as the risk demand index is in an "average" or "above average" risk demand range. In times of relatively low risk demand, long positions in the baskets are converted to short positions. In one experiment, the inventor discovered that the unconditional strategy worked best for the forward bias basket; while the conditional strategy worked best for the risk basket. It was also observed that the combination basket yielded superior results to any of the individual trading strategies. This finding suggests that while the forward bias basket remains a valid strategy, returns can be potentially enhanced by adjusting the final weights of the currencies in the forward bias basket depending on the overall level of the risk demand index.

Figure 15:
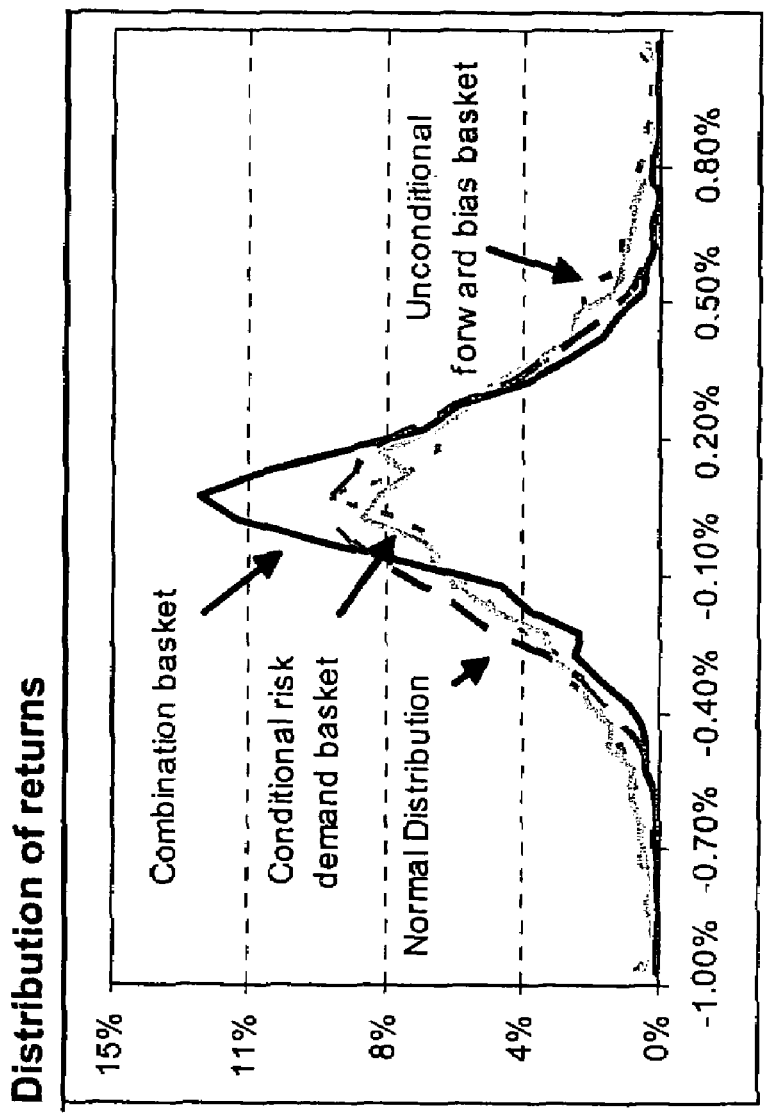
FIG. 15 includes a graph of experimental results for investment returns realized in association with practice of certain embodiments of the invention.

Furthermore, FIG. 14 includes a summary tabulation of the experimental results for the three baskets. In addition, FIG. 15 highlights the distribution of daily returns of the unconditional forward bias basket, the conditional risk basket, and the combination basket and compares them to a normal distribution. As can be seen, not only does the combination strategy reduce the "fatness" in the tails of the distribution of the returns of the individual baskets, but its tails are even thinner than those of a normal distribution. The combination basket also has a higher mean than the unconditional forward bias basket.

Another example illustrates practical application of the risk demand index of the present invention to a currency investment strategy. The first step of the investment strategy is to identify which spot currency rates are most correlated with the standardized risk demand index and then aggregate the identified currencies into a risk optimized basket. In one approach, all G10 spot crosses are individually regressed on the trading signal represented by the standardized risk demand index. The weights of the risk optimized basket may be configured to be proportional to the strength of the coefficients of each currency against all other G10 currencies. An example of the regression analysis involving the weights of different currencies is illustrated by the tables shown in FIG. 16A and FIG. 16B.

In this example, a further step of the investment strategy is to identify the trading signal to be applied in association with the risk optimized basket. Two trading rule variations may be applied: for a first variation, all volatility measures are eliminated; for a second variation, the overall signal is generated by scaling the standardized risk demand index with the dispersion index. A final trading signal may be constructed by modifying the standardized risk demand index to exclude the option implied volatility sub-indices and then adjusting or scaling the standardized risk demand by the level of the dispersion index.

Another step of the investment strategy of this example involves identifying the trading rule. Three different approaches may be undertaken for the trading rule: in the first approach, exposure to the basket is proportional to the level of the trading signal (i.e., a stronger signal results in recommending greater exposure to the trade); in the second approach, three trading instructions are identified depending on the level of the trading signal (i.e., "long," "short," and "flat"); and, in the third approach, two trading instructions may be used depending on the level of the trading signal ("long" and "short"). It was found that the third approach maximized results for the risk optimized portfolio. In summary, one example of a currency investment strategy involving a risk optimized portfolio recommends being long the risk optimized basket when the trading signal (defined as the standardized risk demand index excluding implied volatility sub-indices and scaled by the dispersion index) rises above a predetermined level (defined as high risk demand), and being short at all other times (defined as low risk demand).

Figure 17:
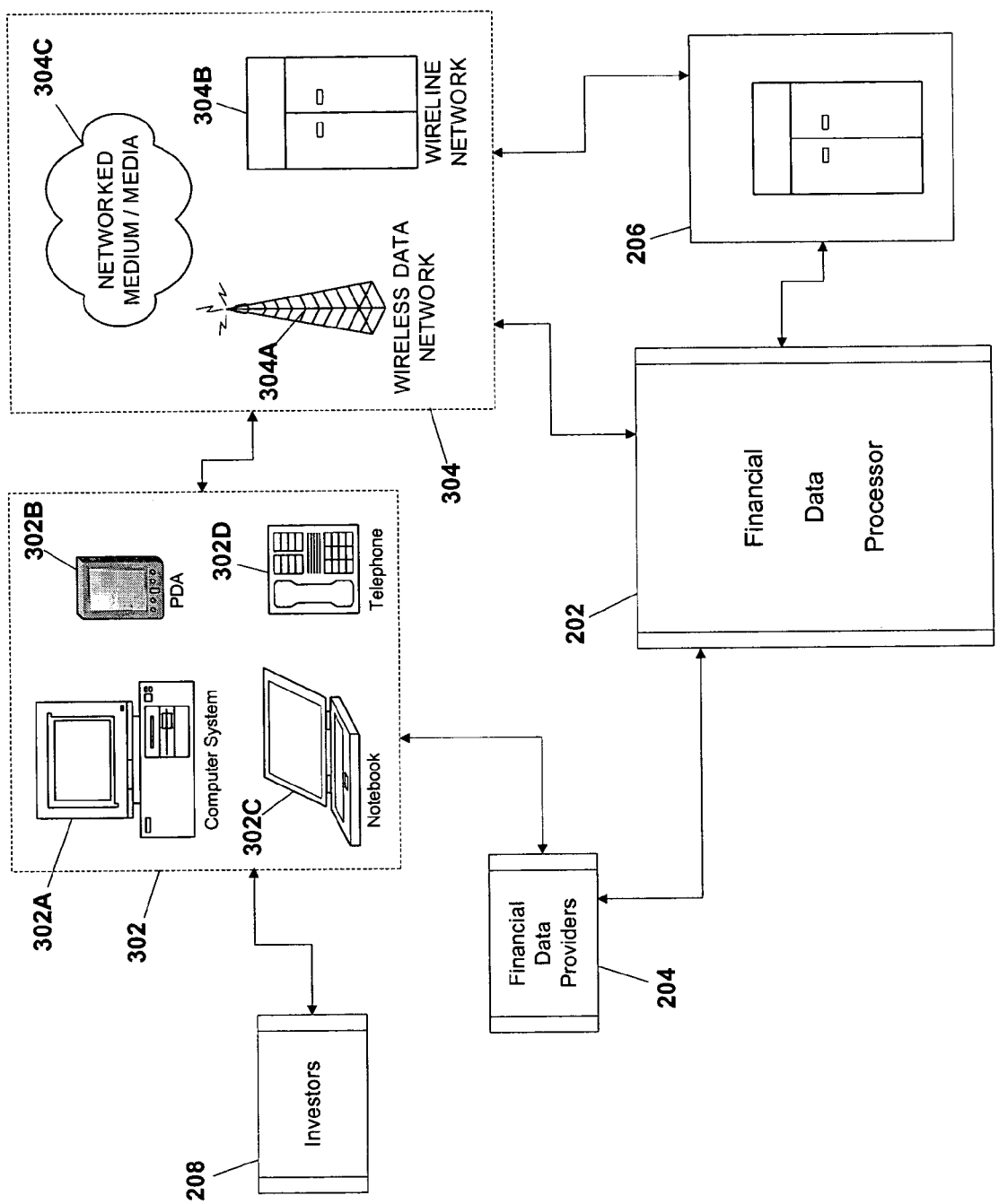

With reference to FIG. 17, the financial data processor 202 may communicate with the financial data providers 204 and/or the investors 208 through one or more different kinds of access devices 302 operative for transmitting data and other information through various communication media 304. Examples of access devices 302 may include, without limitation, a computer system 302A, a personal digital assistant 302B, a notebook 302C, or a telephone 302D (of either wireless or wireline variety). Examples of communication media 304 may include, without limitation, a wireless data network 304A, a wireline network 304B, or any suitable networked medium or media 304C. For example, one of the investors 208 may access risk demand index information by using a notebook 302C to access a web site of the financial data processor 202 through a wireless Internet connection 304A.

The benefits of the risk demand indices of the present invention will be readily apparent to those skilled in the art. The risk demand index offers a simple and effective way for investors, financial service providers, and other entities to manage investment risk in view of perpetually changing global market conditions. The modular approach of the present invention permits selection of desired sub-index modules for customization to a particular analysis objective. It can be appreciated that use of multiple sub-index modules (1) limits the potentially misinterpretive effect of any individual sub-index module on the overall risk demand index; and (2) facilitates identification of the impact of any single sub-index module on risk demand. Trading signals constructed in accordance with the invention can take into account the degree of uniformity or dispersion in the message stemming from the different sub-index modules that comprise the risk demand index. In summary, the present invention recognizes that monitoring developments in risk demand for a variety of markets can be extremely useful in helping investors bolster their portfolios against changes in risk demand. The risk demand index of the present invention is a simple, effective and flexible tool for monitoring changes in risk demand that warrant the scaling back of exposure to riskier assets.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A computer-implemented method for calculating risk demand index values over a plurality of time periods, wherein the risk demand index values are indicative of market demand for risky assets, the method comprising:

calculating, by a computer system, sub-index values over the plurality of time periods for each of a plurality of sub-indices, wherein the sub-indices comprise at least four of the following sub-indices:

(i) a bond sub-index, wherein calculating the bond sub-index comprises calculating, by the computer system, a bond sub-index value based on a difference between a data value associated with an emerging market bond index and a data value associated with a government bond index;

(ii) a commodity sub-index, wherein calculating the commodity sub-index comprises calculating, by the computer system, a commodity sub-index value based on a difference between a data value associated with a base metal index and a data value associated with a precious metals index;

(iii) a bond/equity sub-index, wherein calculating the bond/equity sub-index comprises calculating, by the computer system, a bond/equity sub-index value that is based on a difference between a data value associated with a government bond index and a data value associated with an equity index;

(iv) an equity sub-index, wherein calculating the equity sub-index comprises calculating, by the computer system, an equity sub-index value based on a difference between a data value associated with a cyclical stock index and a data value associated with a non-cyclical stock index;

(v) a first credit sub-index, wherein calculating the first credit sub-index comprises calculating, by the computer system, a first credit sub-index value based on a difference between a data value associated with for a high yield debt instrument index and a data value associated with a high grade debt instrument index;

(vi) a second credit sub-index, wherein calculating the second credit sub-index comprises calculating, by the computer system, a second credit sub-index value based on a difference between a data value associated with a government bond index and a data value associated with a high grade debt instrument index; and calculating, by the computer system, for each of the plurality of time periods, a risk demand index value based on the at least four sub-index values; and outputting, by the computer system, the risk demand index values, wherein the computer system comprises a processor and a computer readable medium that stores instructions for execution by the processor.

2. The method of claim 1, wherein calculating the risk demand index value based on the at least four sub-index values includes calculating the risk demand index value based an average value of the at least four sub-index values.

3. The method of claim 2, wherein calculating the risk demand index value based on the average value of the at least four sub-index values includes calculating the risk demand index value based on a geometric average value of the at least four sub-index values.

4. The method of claim 1, further comprising standardizing, by the computer system, the calculated risk demand index value to conform to a mean value.

5. The method of claim 4, further comprising adjusting an investment portfolio in accordance with the standardized risk demand index value.

6. The method of claim 5, wherein adjusting the investment portfolio includes converting at least one long position to at least one short position.

7. The method of claim 5, wherein adjusting the investment portfolio includes converting at least one short position to at least one long position.

8. The method of claim 1, further comprising calculating, by the computer system, a dispersion index value based on a standard deviation of the at least four sub-index values.

9. The method of claim 8, further comprising scaling, by the computer system, the risk demand index value using the calculated dispersion index value.

10. The method of claim 1, further comprising generating, by the computer system, a graphical representation of risk demand index value for the plurality of time periods.

11. The method of claim 1, further comprising adjusting an investment portfolio in accordance with the calculated risk demand index.

12. The method of claim 11, wherein adjusting the investment portfolio includes converting at least one long position to at least one short position.

13. The method of claim 11, wherein adjusting the investment portfolio includes converting at least one short position to at least one long position.

14. The method of claim 11, wherein the investment portfolio includes a basket of investments.

15. The method of claim 1, wherein:
calculating the sub-index values over the plurality of time periods comprises calculating the sub-index values for each of a plurality of consecutive trading days; and
calculating for each of the plurality of time periods, the risk demand index value comprises calculating the risk demand index value for each of a plurality of consecutive trading days.

16. The method of claim 1, further comprising calculating, by the computer system, at least one volatility sub-index value over the plurality of time periods, and wherein calculating the risk demand index value over the plurality of time periods comprises calculating the risk demand index value over the plurality of time periods based on the at least four sub-index values and the at least one volatility sub-index value.

17. The method of claim 16, wherein the at least one volatility sub-index value comprises a volatility sub-index value for at least one of the following volatility sub-indices:
an equity market volatility sub-index;
a bond market volatility sub-index; and
a currency exchange (FX) sub-index.

18. The method of claim 1, further comprising calculating, by the computer system, a swap spread sub-index value over the plurality of time periods, and wherein calculating the risk demand index value over the plurality of time periods comprises calculating the risk demand index value over the plurality of time periods based on the at least four sub-index values and the swap spread sub-index value.

19. The method of claim 16, further comprising calculating, by the computer system, a swap spread sub-index value over the plurality of time periods, and wherein calculating the risk demand index value over the plurality of time periods comprises calculating the risk demand index value over the plurality of time periods based on the at least four sub-index values, the at least one volatility sub-index value, and the swap spread sub-index value.

20. The method of claim 1, wherein:
the at least four sub-indices comprises the bond sub-index; and
the bond sub-index value for a current time period is calculated based on a difference between (i) a percent change of the emerging market bond index between a prior time period and the current time period, and (ii) a percent change of the government bond index between the prior time period and the current time period.

21. The method of claim 20, wherein:
the at least four sub-indices comprises the commodities sub-index; and
the commodities sub-index value for the current time period is calculated based on a difference between (i) a percent change of the base metal index between the prior time period and the current time period, and (ii) a percent change of the precious metals index between the prior time period and the current time period.

22. The method of claim 1, wherein at least one of the four sub-index values for a current time period is calculated based on a difference between (i) a percent change of a first index between a prior time period and the current time period, and (ii) a percent change of a second index between the prior time period and the current time period.

23. The method of claim 1, wherein the at least four sub-indices comprise the bond sub-index, the commodities sub-index, and the equity sub-index.

24. A computer-readable medium including instructions for causing a computer to execute a method for calculating risk demand index values over a plurality of time periods that are indicative of market demand for risky assets, the medium comprising instructions for:
calculating sub-index values for the plurality of time periods for each of a plurality of sub-indices that comprises at least four of the following sub-indices:
(i) a bond sub-index, wherein the bond sub-index value is calculated based on a difference between a data value associated with an emerging markets index and a data value associated with a government bond index;
(ii) a commodity sub-index, wherein the commodity sub-index value is calculated based on a difference between a data value associated with a base metal index and a data value associated with a precious metals index;
(iii) a bond/equity sub-index, wherein the bond/equity sub-index value is calculated based on a difference between a data value associated with a government bond index and a data value associated with an equity index;
(iv) an equity sub-index, wherein the equity sub-index value is calculated based on a difference between a data value associated with a cyclical stock index and a data value associated with a non-cyclical stock index;

(v) a first credit sub-index, wherein the first credit sub-index value is calculated based on a difference between a data value associated with a high yield debt instrument index and a data value associated with a high grade debt instrument index;

(vi) a second credit sub-index, wherein the second credit sub-index value is calculated based on a difference between a data value associated with a government bond index and a data value associated with a high grade debt instrument index; and calculating for each of the plurality of time periods a risk demand index value based on the at least four sub-index values.

25. A system for calculating risk demand index values over a plurality of time periods that are indicative of market demand for risky assets, the system comprising:

a financial data processing system comprising at least one computer system, the at least one computer system comprising a processor and memory that stores instructions that when executed by the processor cause the at least one computer system to:

calculate sub-index values over the plurality of time periods of each of a plurality of sub-indices comprising at least four of the following sub-indices:

(i) a bond sub-index, wherein the bond sub-index value is calculated based on a difference between a data value associated with an emerging markets index and a data value associated with a government bond index;

(ii) a commodity sub-index, wherein the commodity sub-index value is calculated based on a difference between a data value associated with a base metal index and a data value associated with a precious metals index;

(iii) a bond/equity sub-index, wherein the bond/equity sub-index value is calculated based on a difference between a data value associated with a government bond index and a data value associated with an equity index;

(iv) an equity sub-index, wherein the equity sub-index value is calculated based on a difference between a data value associated with a cyclical stock index and a data value associated with a non-cyclical stock index;

(v) a first credit sub-index, wherein the first credit sub-index value is calculated based on a difference between a data value associated with a high yield debt instrument index and a data value associated with a high grade debt instrument index;

(vi) a second credit sub-index, wherein the second credit sub-index value is calculated based on a difference between a data value associated with a government bond index and a data value associated with a high grade debt instrument index; and calculating for each of the plurality of time periods a risk demand index value based on the at least four sub-index values.

26. The system of claim 25, further comprising an index data storage medium in communication with the at least one computer system that stores data used in computing the at least four sub-index values.

* * * * *

UNITED STATES PATENT AND TRADEMARK OFFICE
CERTIFICATE OF CORRECTION

| | | |
|---|---|---|
| PATENT NO. | : 7,617,143 B2 | Page 1 of 1 |
| APPLICATION NO. | : 11/128815 | |
| DATED | : November 10, 2009 | |
| INVENTOR(S) | : Francesca Fornasari | |

It is certified that error appears in the above-identified patent and that said Letters Patent is hereby corrected as shown below:

Column 11, line 9, delete "an" and substitute --on--

Signed and Sealed this

Sixteenth Day of March, 2010

David J. Kappos
*Director of the United States Patent and Trademark Office*